United States Patent [19]

Wakayama et al.

[11] Patent Number: 4,682,036
[45] Date of Patent: Jul. 21, 1987

[54] GAMMA RAY COMPENSATION-TYPE NEUTRON IONIZATION CHAMBER

[75] Inventors: Naoaki Wakayama; Hideshi Yamagishi, both of Ibaraki; Shinji Fukakusa; Toshimasa Tomoda, both of Amagasaki, all of Japan

[73] Assignees: Japan Atomic Energy Research Institute; Mitsubishi Denki Kabushiki Kaisha, both of Japan

[21] Appl. No.: 693,889

[22] Filed: Jan. 23, 1985

[30] Foreign Application Priority Data

Jan. 23, 1984 [JP] Japan .................................. 59-9721

[51] Int. Cl.$^4$ ........................ G01T 1/185; G01T 3/00
[52] U.S. Cl. .................................. 250/374; 250/385; 250/390
[58] Field of Search ................... 250/385, 390 R, 392, 250/374

[56] References Cited

U.S. PATENT DOCUMENTS 2,976,418 3/1961 Johnson .......................... 250/390 R
4,197,463 4/1980 Todt et al. ...................... 250/390 R
4,302,696 11/1981 Wakayama et al. ................ 250/385

FOREIGN PATENT DOCUMENTS 1589434 5/1981 United Kingdom .

Primary Examiner—Carolyn E. Fields
Attorney, Agent, or Firm—Leydig, Voit & Mayer

[57] ABSTRACT

A neutron ionization chamber of the gamma ray compensation type comprises a neutron-sensing ionization chamber portion having an electrode surface coated with a material for sensing neutrons, a gamma ray-sensing ionization chamber portion which has a low neutron sensitivity in comparison with the neutron sensitivity of said neutron-sensing material, a device for substracting ionization currents in the gamma ray-sensing ionization chamber portion from ionization currents in the neutron-sensing ionization chamber portion, and a coating material which is coated on an electrode surface of the gamma ray-sensing ionization chamber portion, the coating material including a material for sensing neutrons the percentage of which is less than the the percentage of the neutron sensing material of the neutron sensing ionization chamber portion.

6 Claims, 1 Drawing Figure

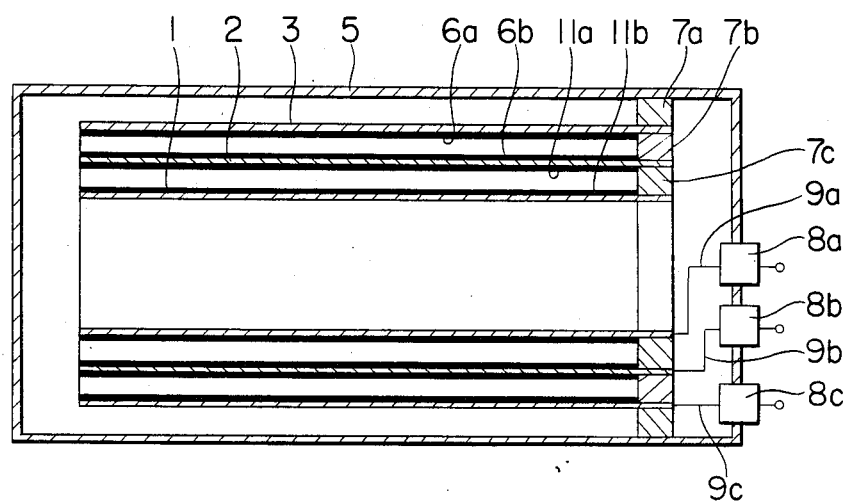

GAMMA RAY COMPENSATION-TYPE NEUTRON IONIZATION CHAMBER

BACKGROUND OF THE INVENTION

The present invention relates to a neutron ionization chamber of a gamma ray compensation type, and more particularly, to an improvement for a compensating characteristic of ionization currents caused by incident gamma rays.

In a conventional ionization chamber of this type, a cylindrical compensating electrode is concentrically disposed within a cylindrical signal electrode, and a cylindrical high voltage electrode is concentrically disposed outside the signal electrode. These three electrodes are held in a metallic casing having a gas-tight structure. The inner and outer circumferential surfaces of the high voltage and signal electrodes are respectively coated by a material including enriched boron in which the percentage of boron 10 is greater than in natural boron, in which boron 10 constitutes about 19%. Boron 10 has a large neutron reaction cross section and thus has a high neutron reaction rate. Ring-shaped insulating materials are disposed between the casing and the high voltage electrode, the high volage and signal electrodes, and between the signal and compensating electrodes to electrically insulate and concentrically retain them. A gas for ionization is sealed within the casing to produce ionization between the respective electrodes.

In the ionization chamber constituted as above, when a radiant ray, i.e., a gamma ray enters the ionization chamber, the gas between the compensating and signal electrodes is ionized by secondary electrons which are caused to be emitted from the electrode surfaces by the incident gamma rays. A part of the gamma rays causes ionization of the gas by directly acting on it, but such ionization is insignificant.

Accordingly, when a voltage negative to the voltage of the signal electrode is applied to the compensating electrode, an ionization current $I_\gamma$ flows from the signal electrode to the compensating electrode. Between the signal and high voltage electrodes, the incident gamma rays also cause ionization of the gas as well between the signal and compensating electrodes, and boron 10 atoms of the enriched boron on the inner and outer circumferential surfaces of the high voltage and signal electrodes, respectively, react with neutrons and emit charged particles at a high speed, also causing ionization of the gas.

Accordingly, when a voltage positive to the voltage of the signal electrode is applied to the high voltage electrode, a neutron ionization current In, caused by neutrons, and a gamma ray ionizatin current $I_{\gamma'}$ flow from the high voltage electrode to the signal electrode in proportion to the intensities of neutron and gamma rays. Hence, a signal current of $Is = In + I_{\gamma'} - I_\gamma$ flows in the signal electrode.

The values $I_\gamma$ and $I_{\gamma'}$ of the ionization currents caused by the gamma rays are proportional to the surface areas of the electrodes, the rate at which the secondary electrons are emitted from the electrode surfaces, and the number of gas molecules between the electrodes. These values can be adjusted such that approximately $I_{\gamma'} = I_\gamma$ by suitably choosing the electrode diameters. In such a condition, the signal current Is equals the neutron current In, and thus is proportional to a neutron flux.

As mentioned above, an object of the ionization chamber is to compensate or cancel the gamma ray ionization currents and take out only the neutron ionization current In.

The rate at which secondary electrons are emitted from the electrode surfaces depends on the electrode material, and on the energy of the incident gamma rays, and the manner of the dependence also depends on the electrode materials. Accordingly, even when the gamma ray ionization currents caused by the incident gamma rays are completely compensated at some energy level of the gamma rays, the rate of the secondary electrons emitted from the respective electrodes is changed by an energy change of the incident gamma rays, since the electrode surfaces of the neutron sensing ionization chamber portion are coated with a material containing enriched boron and are different from the electrode surfaces of the gamma ray-sensing ionization chamber portion without a coating material. Thus, a difference between the gamma ray ionization currents $I_\gamma$ and $I_{\gamma'}$ is produced, and these ionization currents are not completely compensated so that the neutron ionization current in proportional to a neutron flux cannot be exactly taken out.

SUMMARY OF THE INVENTION

Accordingly, an object of the present invention is to provide a gamma ray compensation-type neutron ionization chamber in which gamma ray ionization currents caused by incident gamma rays are completely compensated for all times irrespective of the energy level change of the incident gamma rays so that it is possible to take out only a neutron ionization current in proportion to a neutron flux.

With the above object in view, the present invention provides a neutron ionization chamber of the gamma ray compensation type comprising a neutron-sensing ionization chamber portion having an electrode surface coated with a material for sensing neutrons, a gamma ray-sensing ionization chamber portion which has a low neutron sensitivity in comparison with the neutron sensitivity of the neutron-sensing material, means for subtracting ionization currents in the gamma ray-sensing ionization chamber portion from ionization currents in the neutron-sensing ionization chamber portion, and a coating material which is coated on an electrode surface of the gamma ray-sensing ionization chamber portion, said coating material including a material for sensing neutrons the percentage of which is less than the percentage of said neutron sensing material of the neutron sensing ionization chamber portion.

BRIEF DESCRIPTION OF THE DRAWING

The sole FIGURE is a schematic sectional view showing the structure of one embodiment of a neutron ionization chamber of the gamma ray compensation type according to the present invention.

DESCRIPTION OF THE PREFERRED EMBODIMENTS

In the sole FIGURE, a neutron ionization chamber of the gamma ray compensation type according to the present invention comprises a compensating electrode 1, a signal electrode 2 disposed outside the compensating electrode 1, and a high voltage electrode 3 disposed outside the signal electrode 2. The electrodes 1, 2 and 3 are preferably cylindrical and disposed within a casing 5 of the ionization chamber which is preferably metallic and has a gas-tight structure. The signal electrode 2 is concentrically disposed between the compensating electrode 1 and the high-voltage electrode 3. The compensating, signal, and high-voltage electrodes 1, 2 and 3 are concentrically retained and secured to the casing 5 by respective ring-shaped insulating materials 7c, 7b and 7a for electrically insulating the electrodes from each other. A neutron flux can be measured by a current flowing in the cylindrical signal electrode 2. Output terminals 8a, 8b and 8c attached to the casing 5 are respectively electrically connected to the compensating, signal and high voltage electrodes 1, 2 and 3 through lead wires 9a, 9b and 9c to electrically connect the respective electrodes to the exterior of the casing 5. A voltage lower than a voltage of the signal electrode 2 is applied to the compensating electrode 1, and a voltage higher than the voltage of the signal electrode 2 is applied to the high voltage electrode 3. An ionizing gas is sealed within the casing 5 so as to fill the space between the compensating and signal electrodes, and between the signal and high voltage electrodes. The ionizing gas can move between the electrodes, and ionization of the gas between the electrodes is produced when gamma rays enter the ionization chamber.

The high voltage electrode 3, the outer circumferential wall of the signal electrode 2, and the gas disposed between the high voltage and signal electrodes 3 and 2 form a neutron-sensing ionization chamber, and the compensating electrode 1, the inner circumferential wall of the signal electrode 2, and the gas disposed between the compensating and signal electrodes 1 and 2 form a gamma ray-sensing chamber.

The inner and outer circumferential surfaces 6a and 6b of the high voltage and signal electrodes 3 and 2 are respectively coated with a material including enriched boron containing a greater percentage of boron 10 than does natural boron, which comprises about 19% boron 10. As stated before, boron 10 has a large neutron reaction cross section, i.e., a large rate of neutron reaction. The inner and outer circumferential surfaces 11a and 11b of the signal and compensating electrodes 2 and 1 are respectively coated by a material including a depleted boron in which the percentage of boron 10 is less than in natural boron, i.e., less than about 19%. Tlhe thicknesses of the coating materials on the inner and outer circumferential surfaces 6a and 6b are preferably equal to the thicknesses of the coating materials on the inner and outer circumferential surfaces 11a and 11b. The reduction rate of the neutron sensitivity becomes low as the percentage of boron 10 becomes low. In the present invention, the percentage of boron 10 in the coating materials of the neutron sensing ionization chamber portion is greater than the percentage of boron 10 in the coating materials of the gamma ray sensing ionization chamber portion to obtain a neutron sensitivity.

Next, the compensation of gamma ray ionization currents in the ionization chamber caused by incident gamma rays will be explained. If the atomic number of an atom is the same as that of another atom, processes in which atoms absorb gamma rays and are thereby scattered equal each other even when the mass numbers of these atomic nuclei are different from each other. Namely, with respect to the incident gamma ray, the processes of an atom is equal to processes of an isotope thereof. Accordingly, when the thickness of the coated enriched boron generally equals the thickness of the coated depleted boron, the rates at which secondary electrons are emitted from the electrode surfaces of the neutron- and gamma-ray sensing ionization chamber portions are equally changed according to the energy change of the incident gamma rays. Hence, when the gamma ray ionization currents are set to be completely compensated or cancelled out at the energy level of the incident gamma rays, the gamma ray ionization currents in the neutron and gamma ray ionization chamber portions are equal to each other at all times thereby not to break the compensation even at another energy level different from the set energy of the incident gamma rays.

Although the neutron reaction cross section of a boron 11 which is the major component of the depleted boron is insignificant and can be neglected, an ionization current proportional to a neutron flux also flows in the gamma ray sensing ionization chamber portion by the slight amount of boron 10 contained in the depleted boron. Therefore, this ionization current is subtracted from the ionization currents of the neutron sensing ionization chamber portion, slightly lowering the neutron sensitivity of the neutron ionization chamber which however does not cause any practical problem. Boron 11 is an isotope of boron 10 having a low neutron reaction cross section in comparison with the neutron reaction cross section of boron 10.

In the above embodiment, the electrode surfaces of the gamma ray sensing ionization chamber portion are coated with depleted boron in which the percentage of boron 10 is less than in natural boron, but may be coated with natural boron having a boron 10 percentage of about 19%. When enriched boron is used as a coating material for sensing neutrons on the electrode surfaces of the neutron sensing ionization chamber portion in the form of a chemical compound or a mixture, depleted or natural boron may be coated on the electrodes surfaces of the gamma ray ionization chamber portion in the form of the same chemical compound or mixture. In the above example of a coating material, the enriched boron in the neutron sensing ionization chamber portion contains 94% by weight of boron 10 and 6% by weight of boron 11, and the natural boron in the gamma ray sensing ionization chamber portion contains about 19% by weight of boron 10 and about 81% by weight of boron 11.

Furthermore, in an ionization chamber of the gamma ray compensation type using as a neutron sensing material enriched uranium containing a greater percentage of uranium 235 than natural uranium, the electrode surfaces of the neutron-sensing ionization chamber portion may be coated with enriched uranium, a chemical compound comprising enriched uranium, or a mixture comprising enriched uranium. Further, the electrode surfaces of the gamma ray-sensing ionization chamber portion may be coated with a material including depleted uranium in which the percentage of $^{235}U$ is less than in natural uranium, natural uranium, a chemical compound comprising depleted or natural uranium, or a mixture comprising depleted or natural uranium. The depleted or natural uranium preferably has a chemical form in conformity with the chemical form of the enriched uranium. For example, uranium 238 may be used which has a low neutron reaction cross section in comparison with the neutron reaction cross section of uranium 235.

Furthermore, in an ionization chamber of the gamma ray compensation type using as a neutron sensing material enriched lithium in which the percentage of $^6Li$ is greater than in natural lithium, the electrode surfaces of the neutron-sensing chamber portion may be coated with enriched lithium, a chemical compound comprising enriched lithium, or a mixture comprising enriched lithium. Further, the gamma ray sensing ionization chamber portion may be coated with a material including depleted or natural lithium in which the percentage of $^6$Li is less than or equal to that in natural lithium, a chemical compound comprising depleted or natural lithium, or a mixture comprising depleted or natural lithium. The depleted or natural lithium preferably has a chemical form in conformity with that of the enriched lithium. For example, lithium 7 may be used which has a low neutron reaction cross section in comparison with the neutron reaction cross section of lithium 6.

As mentioned above, according to the present invention, the electrode surfaces of a gamma ray ionization chamber portion are coated with a material a major component of which is an isotope of a material for sensing neutrons in a neutron sensing ionization chamber portion, the isotope having a small neutron reaction cross section in comparison with the neutron reaction cross section of the neutron sensing material of the neutron ionization chamber portion. Accordingly, the gamma ray ionization currents can be completely compensated for at all times irrespective of the energy level change of the incident gamma rays.

What is claimed is:

1. A neutron ionization chamber of the gamma ray compensation type comprising:
   a neutron sensing ionization chamber portion having an electrode surface coated with a neutron-sensing material;
   a gamma ray sensing ionization chamber portion which has a low neutron sensitivity in comparison with the neutron sensitivity of said neutron-sensing material;
   means for subtracting ionization currents in the gamma ray sensing ionization chamber portion from ionization currents in the neutron sensing ionization chamber portion; and
   a coating material which is coated on an electrode surface of the gamma ray sensing ionization chamber portion, said coating material including a material for sensing neutrons the percentage of which is less than the percentage of said neutron-sensing material of the neutron sensing ionization chamber portion.

2. A neutron ionization chamber of the gamma ray compensation type as claimed in claim 1, wherein said coating material coated on an electrode surface of the gamma ray sensing ionization chamber portion has as a major component thereof an isotope of said neutron-sensing material having a low neutron reaction cross section in comparison with the neutron reaction cross section of the neutron sensing material.

3. A neutron ionization chamber of the gamma ray compensation type as claimed in claim 2 wherein said neutron-sensing material includes at least one of enriched boron in which the percentage of boron 10 is greater than in natural boron, a chemical compound comprising the enriched boron, and a mixture comprising the enriched boron; and said coating material includes at least one of depleted boron in which the percentage of boron 10 is less than in natural boron, natural boron, a chemical compound comprising the depleted or natural boron, and a mixture comprising the depleted or natural boron.

4. A neutron ionization chamber of the gamma ray compensation type as claimed in claim 2 wherein said neutron-sensing material includes at least one of enriched uranium in which the percentage of $^{235}$U is greater than in natural uranium, a chemical compound comprising the enriched uranium, and a mixture comprising the enriched uranium; and said coating material includes at least one of depleted uranium in which the percentage of $^{235}$U is less than in natural uranium, natural uranium, a chemical compound comprising the depleted or natural uranium, and a mixture comprising the depleted or natural uranium.

5. A neutron ionization chamber of the gamma ray compensation type as claimed in claim 2 wherein said neutron-sensing material includes at least one of enriched lithium in which the percentage of $^6$Li is greater than in natural lithium, a chemical compound comprising the enriched lithium, and a mixture comprising the enriched lithium; and said coating material includes at least one of depleted lithium in which the percentage of $^6$Li is less than in natural lithium, natural lithium, a chemical compound comprising the depleted or natural lithium, and a mixture comprising the depleted or natural lithium.

6. A neutron ionization chamber of the gamma ray compensation type as claimed in claim 1, wherein said neutron and gamma ray-sensing ionization chamber portions are cylindrical and the gamma ray-sensing ionization chamber portion is concentrically disposed within the neutron-sensing ionization chamber portion; and said gamma ray sensing ionization chamber portion comprises
   a compensating electrode,
   an inner circumferential wall of a signal electrode disposed outside the compensating electrode, and
   an ionizing gas disposed between the compensating and signal electrodes; and
   said neutron sensing ionization chamber portion comprises
   an outer circumferential wall of the signal electrode,
   a high voltage electrode disposed outside the signal electrode, and
   a gas for ionization disposed between the signal and high voltage electrodes, said coating material being coated on the outer and inner circumferential surfaces of the compensating and signal electrodes, respectively, and said neutron sensing material being coated on the inner and outer circumferential surfaces of the high voltage and signal electrodes, respectively.

* * * * *